United States Patent Office 2,964,574
Patented Dec. 13, 1960

2,964,574

NEW CYCLODODECATRI-(1,5,9)-ENES AND A PROCESS FOR THE PRODUCTION THEREOF CONCURRENTLY WITH OTHER CYCLIC HYDROCARBONS

Günther Wilke, Mulheim an der Ruhr, Germany, assignor to Studiengesellschaft Kohle m.b.H., Mulheim an der Ruhr, Germany No Drawing. Filed Feb. 20, 1957, Ser. No. 641,252

Claims priority, application Germany Feb. 23, 1956

14 Claims. (Cl. 260—666)

This invention relates to new cyclododecatri-(1,5,9)-enes and a process for the production thereof concurrently with other cyclic hydrocarbons having at least eight carbon atoms and at least two double bonds in the ring, for example cyclooctadiene and cyclohexadecatetra-(1,5,9,13)-ene.

The new compounds are cyclo-dodecatri-(1,5,9)-enes of the general formula $C_{12}X_{18}$, in which each X is a hydrogen atom or a hydrocarbon radical, for example compounds of this general formula with two double bonds in the trans-position and one double bond in the cis-position.

According to the invention, the compounds are produced by reacting diolefines, preferably piperylene, isoprene, dimethyl butadiene or, preferably, butadiene, with titanium halides and alkyl aluminum halides.

Instead of using the pure diolefines, it is possible to use as starting materials mixtures of gases which contain these diolefines; for example the dehydrogenation products of butane and butylene, which products can easily be produced technically, are particularly successful.

Various titanium halides, with the titanium in various valency stages, can be used as catalysts. It is most economic to use the chlorides. Moreover, among the dialkyl aluminum halides, the dialkyl aluminum chlorides are the preferred catalysts, it being advantageous to use diethyl aluminum chloride. If a titanium tetrahalide is chosen for the production of the catalysts, it is necessary to use a dialkyl aluminum halide as the other component. When the titanium halides are of a lower valency stage, such as titanium trichloride or titanium dichloride, it is possible to use either dialkyl or aluminum halides or mono-alkyl aluminum dihalides. The molar ratio between titanium and aluminum in the catalyst is preferably between 1:3.5 to 1:5.

Since at least one constituent of the catalyst mixtures is liquid, the diolefines can be caused to react directly in this mixture. It is however also possible to work in the presence of solvents, preferably in the presence of aliphatic or aromatic hydrocarbons, such as hexane, benzene or toluene, or halogenated hydrocarbons such as chlorobenzene or dichlorobenzene.

Even at ordinary temperature, the reaction proceeds with good yields of for example 50 to 60% of cyclododecatri-(1,5,9)-ene. This reaction can however be favourably influenced by raising the temperature, up to 150° C. It is also possible to work at temperatures lower than 0° C., down to approximately —20° C. It is advantageous to work at approximately 40° C. The reaction is generally carried out at ordinary pressure, but sub-atmospheric pressure or elevated pressure can be used if desired. The reaction can if desired be carried out continuously.

Frequently, isomeric reaction products are formed. The required isomers can be recovered from these mixtures by known methods, for example by fractional distillation or crystallization.

The cyclic compounds which are obtained are valuable starting materials for organic syntheses.

Thus, the cyclic organic compounds can be hydrogenated in known manner, for example cyclododecatri-(1,5,9)-ene can be hydrogenated to cyclododecene or cyclododecane. These hydrogenated products can in turn be oxidized in known manner to form the corresponding dicarboxylic acids, for example dodecane-(1,12)-diacid.

On the other hand, the cyclododecatriene can be directly oxidized to form succinic acid.

The dicarboxylic acids obtained are, as is known, valuable starting materials for the production of plastics, for example polyamides.

The following examples further illustrate the invention.

Example 1

5 cc. of diethyl aluminum monochloride are dissolved in a nitrogen atmosphere in 150 cc. of dry and deaerated benzene and 1 to 2 cc. of titanium tetrachloride are added dropwise to this mixture. A brown precipitate is formed. The mixture is heated to approximately 80° C. and pure gaseous butadiene is introduced while stirring. The speed of introduction is so adjusted that all the butadiene is absorbed. Under these conditions, the absorption amounts to approximately 30 g. of butadiene per hour. When the required amount of butadiene has been absorbed, the reaction is stopped, the catalyst is decomposed with water, and benzene and the products which are formed are distilled over with steam. After distillation, cyclododecatri-(1,5,9)-ene with a $B.P._{11mm.}$ of 100° C. and a melting point of 18° C. is obtained in a yield of 60% of the butadiene introduced. The known cyclooctadi-(1,5)-ene is obtained in the first runnings; the known cyclohexadecatetra-(1,5,9,13)-ene is obtained in the last runnings.

Example 2

1 cc. of titanium tetrachloride is dissolved in 150 cc. of absolute benzene in a nitrogen atmosphere and 5 cc. of diethyl aluminum monochloride are introduced dropwise into this mixture while stirring vigorously. The solution becomes dark brown in colour and a brown sediment separates out. 50 g. of pure isoprene are added to the mixture heated to 40° C. The mixture is stirred for 12 hours at this temperature, and the catalyst is then decomposed with methanol and thereafter washed with dilute sulphuric acid and water to remove the inorganic constituents. A small quantity of polyisoprene can be precipitated from the benzene layer by means of acetone. The solution is concentrated and the liquid residue distilled in vacuo. 1,5,9-trimethyl cyclododecatriene is obtained as $C_{15}$ fraction with a $B.P._{13 mm.}=138°$ C., $n_D^{20}=1.5120$ and yield=45–50%.

Example 3

50 cc. of diethyl aluminum monochloride are dissolved under a nitrogen atmosphere in 1.5 litres of absolute benzene in a 5-litre stirrer-type vessel. 10 cc. of titanium tetrachloride are added dropwise to this solution while stirring vigorously. The mixture becomes dark brown in color and a brown precipitate is formed. The mixture is heated to 40° C. and pure butadiene is introduced with vigorous stirring and at such a speed that all the gas is absorbed. The reaction vessel must be cooled so that the temperature does not exceed 40° C. 2.5 kg. of butadiene are taken up in the course of 6 hours. The reaction is then stopped, even though butadiene is absorbed with scarcely reduced speed. (With this mixture, it is possible in principle to polymerize 10–15 kg. of butadiene, but the yield of $C_{12}$-ring compounds then drops to 60–70%.) The solution thus obtained is subjected to steam distillation. The steam distillate is worked up in known manner and there are obtained 2.03 kg. of cyclododecatri-(1,5,9)-ene, this being 81% of the theoretical.

Example 4

10 cc. of diethyl aluminum monochloride are dissolved under nitrogen in 50 cc. of absolute benzene and 2 cc. of titanium tetrachloride are added dropwise to this solution while stirring. A brown sediment separates out, which is centrifuged off under nitrogen and washed several times with absolute benzene until practically no more chlorine can be detected in the supernatant solution. The brown precipitate thus obtained consists of practically pure titanium-III-chloride. The latter is suspended in 150 cc. of absolute benzene and mixed with 8 cc. of diethyl aluminum mono-chloride (molar ratio Ti:Al=1:3.7). Butadiene is introduced into this mixture, as described in Examples 1 and 3. The mixture is worked up in the same way. Cyclododecatri-(1,5,9)-ene is obtained with a yield of 50 to 60%.

Example 5

The procedure is as in Example 3, but diisobutyl aluminum mono-chloride is used as the organic aluminum component. The ratio between titanium and aluminum should be 1:4.5 to 1:4.7 and the initial concentration 60 millimols of titanium per litre. The reaction takes place as in Example 3 and the yield of cyclododecatri-(1,5,9)-ene is 70–80% of the theoretical.

Example 6

The procedure is as in Examples 3 and 5, but di-n-propyl aluminum chloride is used as the organic aluminum component. The yield of cyclododecatri-(1,5,9)-ene is 70 to 80% of the theoretical.

Example 7

The stirrer-type vessel described in Example 3 is provided with an overflow and a filling pipe. In this vessel, the catalyst is dissolved in 1.5 litres of absolute benzene as described in Example 3. (Every step is carried out in a nitrogen atmosphere.) The mixture is heated to 40° C. and pure butadiene is introduced with vigorous stirring with the overflow and filling pipe closed. The temperature is kept at 40° C. by cooling and the stream of butadiene is so adjusted that practically no butadiene escapes from the reaction vessel. With this procedure, 2.5 kg. of butadiene are absorbed over a period of 5 hours. The overflow is then opened and a mixture of cyclododecatriene and benzene (approximately 1:0.65 in parts by volume) is continuously extracted together with other butadiene polymers and catalyst. Care must be taken that the benzene and catalyst concentration obtained after the first 5 hours of filling time is maintained, for which purpose fresh catalyst suspension can be continuously run in from a relatively large supply container through the supply pipe. This catalyst is prepared in absolute benzene from diethyl aluminum mono-chloride and titanium-IV-chloride (molar ratio Ti:Al=1:4.6; 60 millimols of titanium per litre) in the same way as that initially used. By working on this basis, a steady concentration of catalyst, benzene, butadiene and other butadiene polymers is adjusted. Approximately 500 g. of butadiene are reacted per hour. The mixture discharged at the overflow is worked up in the usual manner, the benzene returning to the solvent cycle again after being suitably dried. The cyclododecatri-(1,5,9)-ene is obtained with a yield of 70 to 80% concurrently with other cyclic compounds having different numbers of carbon atoms.

Example 8

1 cc. of titanium tetrachloride is dissolved in an argon atmosphere in 150 cc. of absolute hexane and 5 cc. of diethyl aluminum mono-chloride are introduced into this mixture with vigorous stirring. The solution becomes dark brown in colour and a brown sediment is formed. Pure butadiene is introduced at room temperature and the mixture is stirred vigorously. When 50 to 60 g. of butadiene have reacted, the reaction is stopped by adding a small amount of methanol. The solution is washed with dilute sulphuric acid and water. The polybutadiene is precipitated by means of acetone from the solution dried with calcium chloride. The solution is worked up by distillation. The cyclododecatri-(1,5,9)-ene is obtained with a yield of 50 to 60%.

Example 9

The procedure is as in Example 8, but chlorobenzene is used as solvent. The yield of cyclododecatri-(1,5,9)-ene is 60 to 80%.

What I claim is:

1. Trans-trans-cis-cyclododecatri-(1,5,9)-ene with a B.P.$_{11\ mm.}$ of 100° C. and a melting point of −18° C.

2. Trans-trans-trans-cyclododecatri-(1,5,9)-ene with a B.P.$_{13\ mm.}$ of 95° C. and a melting point of 34° C.

3. Trimethyl cyclododecatri - (1,5,9) - ene with a B.P.$_{13\ mm.}$ 138° C. and an $n_D^{20}$ of 1.5120.

4. Process for the production of cyclododecatri-(1,5,9)-enes which comprises contacting a member selected from the group consisting of butadiene, isoprene, and piperylene, with a catalyst comprising a titanium halide and alkyl aluminum halide to thereby form cyclododecatri-(1,5,9)-enes with other cyclic hydrocarbons containing at least 8 carbon atoms and at least two double bonds in the ring.

5. Process, according to claim 4, in which said titanium halide is a member selected from the group consisting of di-valent, tri-valent, tetra-valent titanium halide.

6. Process, according to claim 4, in which said titanium halide is a titanium chloride.

7. Process, according to claim 4, in which said alkyl aluminum halide is a member selected from the group consisting of dialkyl aluminum halides and mono-alkyl aluminum dihalides.

8. Process, according to claim 4, in which said catalyst comprises a titanium tetrahalide and a dialkyl aluminum halide.

9. Process, according to claim 4, in which said catalyst comprises a titanium trihalide and a dialkyl aluminum halide.

10. Process, according to claim 4, in which said catalyst contains titanium and aluminum in a ratio between about 1:3.5 and 1:5.

11. Process, according to claim 4, in which said contacting is effected at a temperature between about −20° C. and 150° C.

12. Process, according to claim 4, in which said contacting is effected in an inert gas atmosphere.

13. Process, according to claim 4, in which said contacting is effected in the presence of an organic chemically inert solvent.

14. Process, according to claim 13, in which said solvent is a member selected from the group consisting of benzene, hexane, toluene, chlorobenzene, and dichlorobenzene.

References Cited in the file of this patent

UNITED STATES PATENTS

| | | |
|---|---|---|
| 1,318,633 | Weiss et al. | Oct. 14, 1919 |
| 2,285,601 | McAllister | June 9, 1942 |
| 2,323,861 | Zellner | July 6, 1943 |
| 2,401,414 | Doumani et al. | June 4, 1946 |
| 2,557,282 | Hamblet et al. | June 19, 1951 |
| 2,589,648 | Wadsworth | Mar. 18, 1952 |
| 2,686,208 | Reed | Aug. 10, 1954 |
| 2,686,209 | Reed | Aug. 10, 1954 |
| 2,713,067 | Hamblet et al. | July 12, 1955 |
| 2,715,147 | Cope et al. | Aug. 9, 1955 |
| 2,721,189 | Anderson et al. | Oct. 18, 1955 |

FOREIGN PATENTS

| | | |
|---|---|---|
| 538,782 | Belgium | Dec. 6, 1955 |

OTHER REFERENCES

Conant et al.: Chemistry of Organic Compounds (1933), p. 56, 574–6.

Calloway: Chemical Reviews, vol. 17 (1935), p. 374–5.